US011068885B2

(12) United States Patent
Robins (10) Patent No.: US 11,068,885 B2
(45) Date of Patent: Jul. 20, 2021

(54) METHOD AND SYSTEM FOR DEANOMYMIZING CRYPTOCURRENCY USERS BY ANALYZING BANK TRANSFERS TO A CRYPTOCURRENCY EXCHANGE

(71) Applicant: NICE LTD, Ra'anana (IL)

(72) Inventor: Simon Robins, Haifa (IL)

(73) Assignee: NICE LTD., Ra'anana (IL)

( * ) Notice: Subject to any disclaimer, the term of this patent is extended or adjusted under 35 U.S.C. 154(b) by 316 days.

(21) Appl. No.: 16/202,105

(22) Filed: Nov. 28, 2018

(65) Prior Publication Data

US 2020/0167763 A1 May 28, 2020

(51) Int. Cl.
| | |
|---|---|
| *G06Q 20/40* | (2012.01) |
| *G06Q 30/02* | (2012.01) |
| *G06Q 20/32* | (2012.01) |
| *G06Q 20/34* | (2012.01) |
| *G06Q 20/38* | (2012.01) |
| *G06Q 20/36* | (2012.01) |
| *G06Q 20/06* | (2012.01) |
| *H04L 29/06* | (2006.01) |
| *G06Q 40/02* | (2012.01) |

(52) U.S. Cl.
CPC ..... *G06Q 20/3678* (2013.01); *G06Q 20/0658* (2013.01); *G06Q 20/383* (2013.01); *G06Q 40/02* (2013.01); *H04L 63/302* (2013.01)

(58) Field of Classification Search
CPC .... G06Q 20/00–425; G06Q 40/00–128; H04L 63/00–308
See application file for complete search history.

(56) References Cited

U.S. PATENT DOCUMENTS

| | | | | |
|---|---|---|---|---|
| 10,055,715 | B1* | 8/2018 | Grassadonia | G06Q 20/4012 |
| 10,275,772 | B2* | 4/2019 | Ronca | G06Q 20/3829 |
| 2012/0036073 | A1* | 2/2012 | Basu | G06Q 20/42 |
| | | | | 705/44 |
| 2016/0071108 | A1* | 3/2016 | Caldera | G06Q 20/4016 |
| | | | | 705/39 |
| 2018/0240107 | A1* | 8/2018 | Andrade | G06Q 20/36 |
| 2019/0172067 | A1* | 6/2019 | Arora | G06Q 40/06 |

\* cited by examiner

*Primary Examiner* — John W Hayes
*Assistant Examiner* — Chenyuh Kuo
(74) *Attorney, Agent, or Firm* — Soroker Agmon Nordman (57) ABSTRACT

A computerized method for deanonymizing cryptocurrency users by analyzing bank transfers to a cryptocurrency exchange may include receiving data from a currency transfer made by a user at a bank to a cryptocurrency exchange. Candidate currency exchange transactions made by the user may be identified from the currency exchange transactions completed by the cryptocurrency exchange within a predefined time interval. A set of anonymous transactions in blockchain cryptocurrency ledger in the predefined time interval may be identified where the cryptocurrency value in transactions of anonymous users in a blockchain cryptocurrency ledger matches a currency transfer amount made by the user in the candidate currency exchange transactions. Anonymous transactions in the set may be identified as being made by the user based on the probability assigned to each anonymous transaction in the set.

12 Claims, 5 Drawing Sheets

METHOD AND SYSTEM FOR DEANOMYMIZING CRYPTOCURRENCY USERS BY ANALYZING BANK TRANSFERS TO A CRYPTOCURRENCY EXCHANGE

FIELD OF THE INVENTION

The present invention relates to anti-money laundering, and more specifically to a method and system for deanonymizing cryptocurrency users by analyzing bank transfers to a cryptocurrency exchange and subsequent transcription to a blockchain ledger.

BACKGROUND OF THE INVENTION

Transactions using cryptocurrencies are typically record in distributed ledgers, such as a blockchain, which may be used as a public financial transaction database for tracking the flow of ownership exchange of cryptocurrencies. The largest cryptocurrencies today include Bitcoin, Ethereum, Ripple, Bitcoin Cash, Litecoin, and EOS although there are around 30 cryptocurrencies in use. Each cryptocurrency uses its own distributed ledger for managing and storing transactions.

However, each transaction recorded in the distributed ledger is made by a user that is anonymous. Each transaction record includes only a user ID number for identifying the user that is used when the cryptocurrency exchange executes a transaction, which maintains user anonymity. Cryptocurrency transactions may be used to pay for goods and services as with any currency, and the anonymous transactions appearing on the distributed ledger are not limited to users from the same country.

As a result, the use of cryptocurrencies may be used in a variety of criminal activities such as terror, money laundering, and human trafficking, for example. A user may transfer cryptocurrencies to beneficiaries that may already be under investigation, and or be suspicious entities in connection with many types of criminal activities. Furthermore, the major cryptocurrency exchanges publish their order book data, in order to facilitate third party clients. All transactions on common cryptocurrency blockchains are fully visible, albeit the users may be pseudonymous.

Thus, some anti-money laundering activities may be directed to identifying the anonymous users registered in the transactions of a distributed ledger, such as a blockchain. Some companies may use methods for tracking users on a distributed ledger such as advanced network analytics, voluntary disclosures where users publishing addresses to receive payments, correlation to IP addresses, and/or actively participating in the network (e.g., carrying out transactions or services with a cryptocurrency thereby revealing the identity of the other side).

Thus, it may be desirable to have methods and systems for deanonymizing cryptocurrency users and their transactions recorded in distributed ledgers.

SUMMARY OF THE INVENTION

There is thus provided, in accordance with some embodiments of the present invention, a computerized method for deanonymizing cryptocurrency users by analyzing bank transfers to a cryptocurrency exchange. The method may include:

(a) receiving by a processor of a computer, currency transfer data from a bank including a currency transfer amount and an execution time of a currency transfer from a user at the bank to a cryptocurrency exchange;

(b) monitoring by the processor, a plurality of currency exchange transactions including a size and an exchange price for each currency exchange transaction in the plurality of currency exchange transactions published on the cryptocurrency exchange;

(c) identifying by the processor, candidate currency exchange transactions made by the user from the plurality of currency exchange transactions completed by the cryptocurrency exchange within a predefined time interval;

(d) monitoring by the processor, a plurality of transactions of anonymous users in a blockchain cryptocurrency ledger including anonymous user identification numbers and a cryptocurrency value for each transaction in the plurality of transactions of anonymous users;

(e) identifying by the processor, a set of transactions from the plurality of transactions of anonymous users in the predefined time interval where the cryptocurrency value in the plurality of transactions of anonymous users in the blockchain cryptocurrency ledger matches the currency transfer amount made by the user identified in the candidate currency exchange transactions completed by the currency exchange;

(f) assigning by the processor, a probability to each transaction from the plurality of transactions of anonymous users in the set that each of the transactions in the set was made by the user; and (g) identifying by the processor, transactions made by the user in the set of transactions from the plurality of transactions of anonymous users in the blockchain cryptocurrency ledger based on the probability assigned to each transaction in the set.

Furthermore, in accordance with some embodiments of the present invention, the method may include outputting the probability and the anonymous user identification number of each transaction from the plurality of transactions of anonymous users in the set.

Furthermore, in accordance with some embodiments of the present invention, identifying the candidate currency exchange transactions made by the user may include comparing the size and the price of the cryptocurrency exchanged in the plurality of currency exchange transactions with the currency transfer amount made by the user from the bank.

Furthermore, in accordance with some embodiments of the present invention, the predefined time interval may be based on the execution time of the currency transfer.

Furthermore, in accordance with some embodiments of the present invention, assigning the probability may include estimating a likelihood that each transaction from the plurality of transactions of anonymous users in the set was made by the user divided by a number of transactions in the plurality of transactions of anonymous users within the predefined time interval.

Furthermore, in accordance with some embodiments of the present invention, receiving the currency transfer data may include receiving the currency transfer data of a respective plurality of currency transfers from the user at the bank to the cryptocurrency exchange at different execution times.

Furthermore, in accordance with some embodiments of the present invention, the predefined time interval for each currency transfer in the plurality of currency transfers from the user may be based on the execution time for each currency transfer in the plurality of currency transfers from the bank to the cryptocurrency exchange.

Furthermore, in accordance with some embodiments of the present invention, the method may include repeating (b) to (g) for the plurality of currency transfers, and updating the probability that each transaction in the plurality of transactions of anonymous users for each of the plurality of currency transfers from the user is associated with the user.

Furthermore, in accordance with some embodiments of the present invention, updating the probability may be selected from the set consisting of evaluating a time difference between the plurality of currency transfers from the user and order placement on the cryptocurrency exchange, activity levels of the anonymous users in the blockchain cryptocurrency ledger, and a frequency of a specific currency transfer amount.

Furthermore, in accordance with some embodiments of the present invention, receiving the currency transfer data may include receiving currency transfer data of a respective plurality of currency transfers from different users at the bank to the cryptocurrency exchange at different execution times.

Furthermore, in accordance with some embodiments of the present invention, the predefined time interval for each of the plurality of currency transfers may be based on the different execution times of the currency transfers from the different users from the bank to the cryptocurrency exchange.

Furthermore, in accordance with some embodiments of the present invention, the method may include repeating (b) to (g) for the plurality of currency transfers for each of the different users, and identifying anonymous user identification numbers in the plurality of transactions of anonymous users for each of the plurality of currency transfers associated with each of the different users.

Furthermore, in accordance with some embodiments of the present invention, the method may include storing the identified anonymous user identification numbers associated with each of the different users in a database.

There is further provided, in accordance with some embodiments of the present invention, a computerized system for deanonymizing cryptocurrency users by analyzing bank transfers to a cryptocurrency exchange. The system may include a memory and a processor. The processor may be configured to (a) receive currency transfer data from a bank including a currency transfer amount and an execution time of a currency transfer from a user at the bank to a cryptocurrency exchange, (b) to monitor a plurality of currency exchange transactions including a size and an exchange price for each currency exchange transaction front the plurality of currency exchange transactions published on the cryptocurrency exchange, (c) to identify candidate currency exchange transactions made by the user from the plurality of currency exchange transactions completed by the cryptocurrency exchange within a predefined time interval, (d) to monitoring a plurality of transactions of anonymous users in a blockchain cryptocurrency ledger including anonymous user identification numbers and a cryptocurrency value for each transaction in the plurality of transactions of anonymous users, (e) to identify a set of transactions from the plurality of transactions of anonymous users in the predefined time interval where the cryptocurrency value in the plurality of transactions of anonymous users in the blockchain cryptocurrency ledger matches the currency transfer amount made by the user identified in the candidate currency exchange transactions completed by the currency exchange, (f) to assign a probability to each transaction from the plurality of transactions of anonymous users in the set that each of the transactions in the set was made by the user, and (g) to identify transactions made by the user in the set of transactions from the plurality of transactions of anonymous users in the blockchain cryptocurrency ledger based on the probability assigned to each transaction in the set.

Furthermore, in accordance with some embodiments of the present invention, the processor may be configured to output the probability and the anonymous user identification number of each transaction from the plurality of transactions of anonymous users in the set.

Furthermore, in accordance with some embodiments of the present invention, the processor may be configured to identify the candidate currency exchange transactions made by the user by comparing the size and the price of the cryptocurrency exchanged in the plurality of currency exchange transactions with the currency transfer amount made by the user from the bank.

Furthermore, in accordance with some embodiments of the present invention, the predefined time interval may be based on the execution time of the currency transfer.

Furthermore, in accordance with some embodiments of the present invention, the processor may be configured to assign the probability by estimating a likelihood that each transaction from the plurality of transactions of anonymous users in the set was made by the user divided by a number of transactions in the plurality of transactions of anonymous users within the predefined time interval.

Furthermore, in accordance with some embodiments of the present invention, the processor may be configured to receive the currency transfer data by receiving the currency transfer data of a respective plurality of currency transfers from the user at the bank to the cryptocurrency exchange at different execution times.

Furthermore, in accordance with some embodiments of the present invention, the predefined time interval for each currency transfer in the plurality of currency transfers from the user may be based on the execution time of each currency transfer in the plurality of currency transfers from the bank to the cryptocurrency exchange.

Furthermore, in accordance with some embodiments of the present invention, the processor may be configured to repeat (b) to (g) for the plurality of currency transfers, and to update the probability that each transaction in the plurality of transactions of anonymous users for each of the plurality of currency transfers from the user is associated with the user.

Furthermore, in accordance with some embodiments of the present invention, the processor may be configured to update the probability using features selected from the set consisting of: a time difference between the plurality of currency transfers from die user and order placement on the cryptocurrency exchange, activity levels of the anonymous users in the blockchain cryptocurrency ledger, and a frequency of a specific currency transfer amount.

Furthermore, in accordance with some embodiments of the present invention, the processor may be configured to receive the currency transfer data by receiving currency transfer data of a respective plurality of currency transfers from different users at the bank to the cryptocurrency exchange at different execution times.

Furthermore, in accordance with some embodiments of the present invention, the predefined time interval for each of the plurality of currency transfers may be based on the different execution times of the currency transfers from the different users from the bank to the cryptocurrency exchange.

Furthermore, in accordance with some embodiments of the present invention, the processor may be configured to repeat (b) to (g) for the plurality of currency transfers for each of the different users, and to identify anonymous user identification numbers in the plurality of transactions of anonymous users for each of the plurality of currency transfers associated with each of the different users.

Furthermore, in accordance with some embodiments of the present invention, the processor may be configured to store the identified anonymous user identification numbers associated with each of the different users in a database in the memory.

BRIEF DESCRIPTION OF THE DRAWINGS

In order for the present invention, to be better understood and for its practical applications to be appreciated, the following Figures are provided and referenced hereafter. It should be noted that the Figures are given as examples only and in no way limit the scope of the invention. Like components are denoted by like reference numerals.

DETAILED DESCRIPTION OF THE INVENTION

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

Embodiments of the present invention disclose herein a method and system for deanonymizing cryptocurrency users by analyzing bank transfers to a cryptocurrency exchange. Users of cryptocurrency may transfer a known amount of money from the bank to the cryptocurrency exchange. The cryptocurrency exchange may convert the transferred funds in any currency (e.g., U.S. dollar, Euros, British Pounds) to a cryptocurrency such bitcoins, for example. These exchange transactions may be published, typically in real-time, by the cryptocurrency exchange. In parallel, the fulfilled bitcoin exchange transaction are transcribed on the bitcoin blockchain ledger. However, the fulfilled bitcoin transactions on the cryptocurrency exchange will appear in the bitcoin blockchain ledger with an anonymous user identification number or address. However, the number of bitcoins will be equivalent to the known amount of money in the bank transfer.

If the bank transfer by the user and the USD-to-bitcoin exchange occurs within a reasonable time window after the bank transfers the money to the cryptocurrency exchange, a set of anonymous bitcoin transfer transactions having a size of bitcoins equivalent to the known amount of money transferred by the user to the bitcoin exchange may be monitored on the blockchain in a predefined time interval. The predefined time interval may typically start after the transfer time of the funds from the bank to the cryptocurrency exchange.

A probability may be assigned to each anonymous bitcoin transaction on the blockchain in the set. The probability may be indicative the likelihood that the user made the anonymous bitcoin transactions on the blockchain, so as to match the anonymous user ID on the blockchain with the user.

In some embodiments of the present invention, using the bank transfer amounts and transfer times of fund from a plurality of users with the embodiments taught described herein below, a database with the anonymous user IDs on the blockchain matching the real identity of the plurality of users may be formulated. Anti-money laundering officials, for example, may use the database information to further track cryptocurrency transactions from the plurality of users, such as sending money to criminals, for example, on the blockchain.

Figure 1:
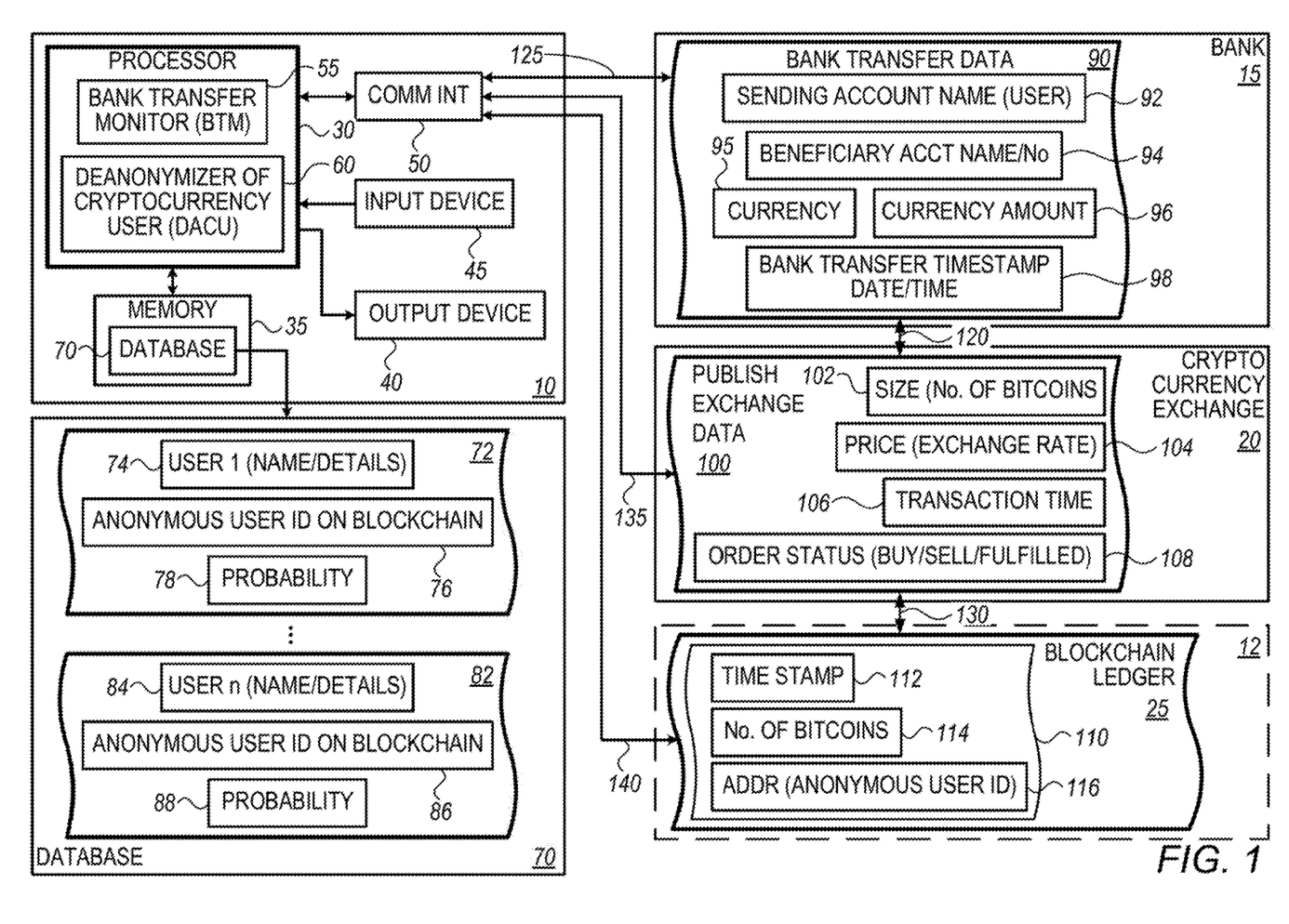
FIG. 1 schematically illustrates a system for deanonymizing cryptocurrency users recorded in a distributed ledger by analyzing bank transfers to a cryptocurrency exchange, in accordance with some embodiments of the present invention.

FIG. 1 schematically illustrates a system 5 for deanonymizing cryptocurrency users recorded in a distributed ledger 25 by analyzing bank transfers 120 to a cryptocurrency exchange 20, in accordance with some embodiments of the present invention. System 5 may include a computer 10 linked with a bank 15, an cryptocurrency exchange 20, and any suitable network 12 of multiple computers capable of transcribing transactions onto distributed ledger 25, such as a blockchain ledger 25.

Computer 10 may include a processor 30 coupled to a memory 35, an input device 45, an output device 40, and a communication circuitry and interface 50. Communication circuitry and interface 50 may be configured to communicate 125 with bank 10, to communicate 135 with cryptocurrency exchange 20, and to communicate 140 with computers 12 managing blockchain ledger 25 over any suitable wired and/or wireless communication network. Additionally, bank 15 and cryptocurrency exchange 20 may be configured to communicate 120 with each other. Cryptocurrency exchange 20 and computers 12 managing blockchain ledger 25 may be configured to communicate 130 with each other such as for transcribing the cryptocurrency exchange data on the blockchain.

In some embodiments of the present invention, computer 10 may be placed in bank 10, or remote from bank 10 in any suitable location.

Processor 30 may include one or more processing units, e.g. of one or more computers. Processor 30 may be configured to operate in accordance with programmed instructions stored in memory 18. Processor 30 may be capable of executing a bank transfer monitor (BTM) 55 application for monitoring bank transfer transactions. Processor 30 may be capable of executing a deanonymizer of cryptocurrency user (DACU) 60 application for deanonymizing cryptocurrency users by analyzing bank transfers from bank 15 to cryptocurrency exchange 20. Bank Transfer Monitor (BTM) 55 application may also be referred to as a Transaction Monitoring System (TMS).

In some embodiments, all or part of the functions performed by BTM 55 may also be referred to herein as an anti-money laundering monitoring system. In other embodiments, all or part of the functions performed by BTM 55 may also be performed by a similarity detector. In yet other embodiments, the anti-money laundering monitoring system may perform all of the functions described herein deanonymizing cryptocurrency users (e.g., DACU 60) by analyzing bank transfers from bank 15 to cryptocurrency exchange 20.

Processor 30 may communicate with output device 40. For example, output device 14 may include a computer monitor or screen. Processor 30 may communicate with a screen of output device 40 such as a display. In another example, output device 40 may include a printer, display panel, speaker, or another device capable of producing visible, audible, or tactile output.

Processor 30 may communicate with input device 45. For example, input device 45 may include one or more of a keyboard, keypad, or pointing device for enabling a user to inputting data or instructions for operation of processor 30.

Processor 30 may communicate with memory 35. Memory 35 may include one or more volatile or nonvolatile memory devices. Memory 35 may be utilized to store, for example, programmed instructions for operation of processor 30, data or parameters for use by processor 30 during operation, or results of operation of processor 30. Memory 35 may include a database 70 of deanonymized cryptocurrency users obtained using the embodiments taught herein.

In operation, processor 30 may execute a method for deanonymizing cryptocurrency users by analyzing bank transfers from bank 15 to cryptocurrency exchange 20.

When a client or a user of banking services transfers currency from a bank account at a bank 15 to a transfer beneficiary, computer 10 at the bank or at any other suitable location may execute a bank transfer monitor (BTM) program 55 for monitoring these currency transfer transactions. These programs may collect, for example, bank transfer data 90 in multiple transfers including a user 92, a transfer beneficiary 94, a currency transfer amount 96, a currency type 95 (e.g., USD, Euro), and the transfer timestamp 98 (e.g., a time of the transaction).

In some embodiments of the present invention, when BTM 55 identifies transfer beneficiary 94 as cryptocurrency exchange 20, computer 10 may execute a program for deanonymizing cryptocurrency users as described heroin. Deanonymizing cryptocurrency users (DACU) program 60 may be part of bank transfer monitor (BTM) program 55, or a stand-alone program. DACU 60 may include a similarity detector, for example, shown hereinbelow. In that the amount of money 96, the timestamp 98 of the transfer, and currency type 95 in bank transfer 120 from bank 15 to the currency exchange are known. DACU 60 may then monitor cryptocurrency exchange transactions 100, which are made public to clients, within a time window (e.g., predefined time interval) typically starting from the transfer timestamp.

In some embodiments of the present invention, DACU 60 may search for a status 108 of orders that are fulfilled, or executed transactions on cryptocurrency exchange 20 involving the same currency transfer amount 96 by the user at bank 15. The fulfilled transactions are transcribed on the blockchain ledger. DACU 60 may identify candidate currency exchange transactions potentially made in the currency transfer by the user from the bank with an equivalent amount of cryptocurrency in currency transfer amount 96. DACU 60 may identify candidate currency exchange transactions that are fulfilled based on monitoring in each cryptocurrency exchange transaction 100: a size 102 (e.g., a number of bitcoins, or a number of cryptocurrency units), a price 104 (e.g., exchange rate between the cryptocurrency and currency 95), an exchange transaction time 106, and order status 108.

The published cryptocurrency exchange data may include the transactions of multiple clients using the cryptocurrency exchange. The multiple clients may be known, anonymous, or pseudonymous (e.g., using fake names). However, if the user transfers a specific currency transfer amount to the cryptocurrency exchange and converts this specific amount to cryptocurrency (e.g., bitcoins), the transaction will appear in the published transactions of the cryptocurrency exchange along with all transactions of multiple clients, as well as being transcribed on the blockchain ledger. However, if another client also converts the same specific amount in a short time interval after the transfer timestamp, it may be difficult for DACU 60 to resolve whether a transaction appearing in the published transactions is from the user or another client.

Furthermore, this uncertainty may also be passed into the analysis of deanonymizing the anonymous users in each of the blockchain transaction record. Hence, probability analysis may be used to assess a likelihood that a cryptocurrency transaction appearing in the blockchain ledger with an anonymous block chain user ID was made by the user initiating the original bank transfer from the bank with a predefined time interval.

DACU 60 may monitor a blockchain for cryptocurrency transactions involving the same currency transfer amount from the hank transfer in the equivalent amount of cryptocurrency. Stated differently, DACU 60 may identify a set of transactions from the plurality of transactions of anonymous users in the predefined time interval where the cryptocurrency value in the plurality of transactions of anonymous users in the blockchain cryptocurrency ledger matches the currency transfer amount made by the user identified in the candidate currency exchange transactions fulfilled by the currency exchange.

Bitcoins obtained by the user from the fulfilled, or executed transactions on the currency exchange from U.S. dollars to bitcoins, for example, are transcribed in bitcoin blockchain ledger 25 within a time interval after bank transfer time 98. These bitcoin transactions may be transcribed as anonymous blockchain transactions 110 in bitcoin blockchain ledger 25 including anonymous user identification numbers 116, a recording timestamp 112 on blockchain ledger 25, and a number of bitcoins 114 (e.g., a cryptocurrency value) for each blockchain transaction 110 for bitcoins.

If the currency transfer amounts by the user are for a very specific amount such as $731.19, for example, DACU 60 may easily track cryptocurrency exchange transactions 100 followed by bitcoin transactions 110 on the blockchain with the same equivalent value of $731.19 in bitcoin units. Conversely, if a number of transactions of bank transfers of $100 are transferred to cryptocurrency exchange 20 followed by anonymous blockchain transactions 110, each with a number of bitcoins 114 with an equivalent value of $100, DACU 60 may have difficulty in assessing which anonymous blockchain transactions in a plurality of anonymous blockchain transactions 110 on blockchain ledger 25 were made by the user.

Accordingly, DACU 60 may assign a probability to each anonymous blockchain transactions that it was executed by the user. DACU 60 may assign the probability by estimating a likelihood that each transaction from the plurality of transactions of anonymous users in the identified set of transactions from the plurality of transactions of anonymous users as described above was made by the user divided by a number of transactions in the plurality of transactions of anonymous users within the predefined time interval.

In the current disclosure, the term distributed ledger, or distributed ledger technology may refer to a blockchain, or a blockchain ledger for recording cryptocurrency transactions, as well as hyperledger, eventual consistency, or any other suitable distributed computing models that may be used for recording cryptocurrency transactions. Similarly, the term cryptocurrency may refer to bitcoins, Ethereum, Ripple, Bitcoin Cash, Litecoin, EOS, and the like. Although example embodiments herein may refer to bitcoins and to blockchains, respectively, as the cryptocurrency and the distributed ledger, this is merely for conceptual clarity and not by way of limitation of the embodiments of the present invention. The embodiments described herein may be applied to any cryptocurrency or any distributed ledger technology.

In anti-money laundering transfer monitoring solutions, users transferring money from bank accounts to cryptocurrency exchanges may be monitored. However, the final beneficiary of this money may not be known. Thus, it may be unclear as to whether the cryptocurrency may be used for criminal activities, or whether the bitcoin transactions are merely used for speculation, for example. By linking the transfer from the bank to the bitcoin exchange data and in turn to the blockchain, the embodiments described herein solve the problem of deanonymizing users with some probability on the blockchain and, therefore, tracking their future transactions on the cryptocurrency blockchain ledger.

In some embodiments of the present invention described herein, computer 10 (e.g., processor 30) may deanonymizing transactions of multiple users in a blockchain ledger by analyzing bank transfers from the multiple users to the cryptocurrency exchange using the embodiments taught herein. Processor 30 may be configured to build and/or store database 70 in memory 35. Database 70 may include p entries, for example, where p is an integer referring to p users. An entry 72 in database 70 for $user_i$ may include a name and details block 74 for $user_i$, an anonymous user id 76 on blockchain 12 associated with blockchain transactions, and a probability 78 that anonymous user id 76 belongs to $user_i$. Similarly, an entry 82 in database 70 for $user_p$ may include a name and details block 84 for $user_p$, an anonymous user id 86 on blockchain 12 associated with blockchain transactions, and a probability 88 that anonymous user id 86 belongs to $user_p$.

Figure 2:
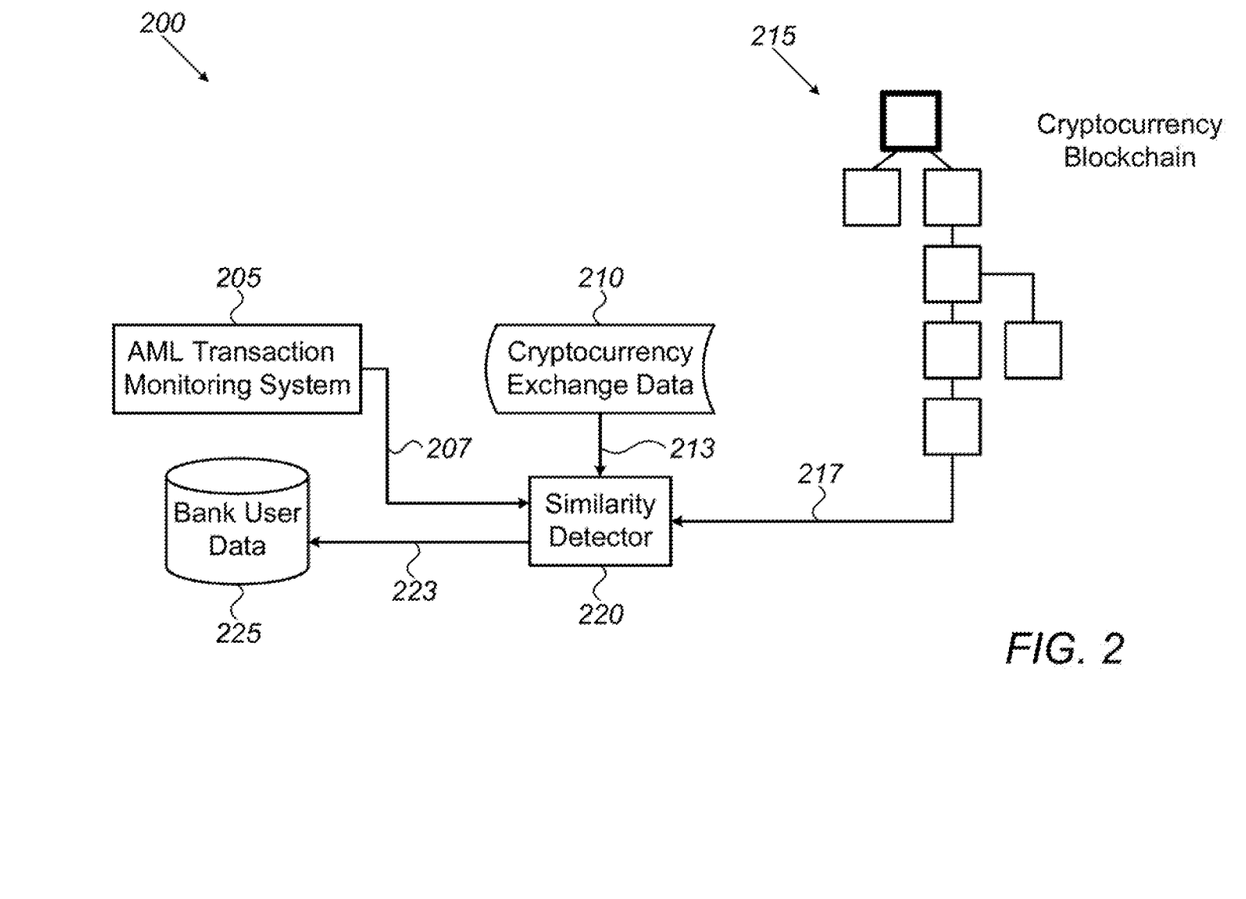
FIG. 2 is a high-level block diagram of a system for deanonymizing cryptocurrency users recorded in a distributed ledger by analyzing bank transfers to a cryptocurrency exchange, in accordance with some embodiments of the present invention.

FIG. 2 is a high-level block diagram 200 of system 5 for deanonymizing cryptocurrency users recorded in a cryptocurrency blockchain 215 by analyzing bank transfers to cryptocurrency exchange 20, in accordance with some embodiments of the present invention. High level block diagram 200 illustrates an Anti-Money Laundering (AML) Transaction Monitoring System 205 operated by computer 10, for example, that monitors bank transactions 90 for Anti-Money laundering (AML) detection. Cryptocurrency Exchange Data 210 may include order book data with a plurality of exchange data transactions 100 as shown in FIG. 1 published by cryptocurrency exchange 20. Cryptocurrency blockchain 215 may include shared public transactions of a cryptocurrency transcribed on the blockchain ledger.

Similarity Detector 220 is a module that may link bank transactions monitored by Anti Money Laundering (AML) Transaction Monitoring System 205. System 205 may match them to transactions 110 and therefore to anonymous users 116 transcribed on cryptocurrency blockchain 215. A bank user data 225 may be stored in database 70 for multiple users, along with a mapping of the multiple users to anonymous blockchain users. For example, each record 82 for $p^{th}$ user in database 70 may map $user_p$ to anonymous user ID 86.

Figure 3:
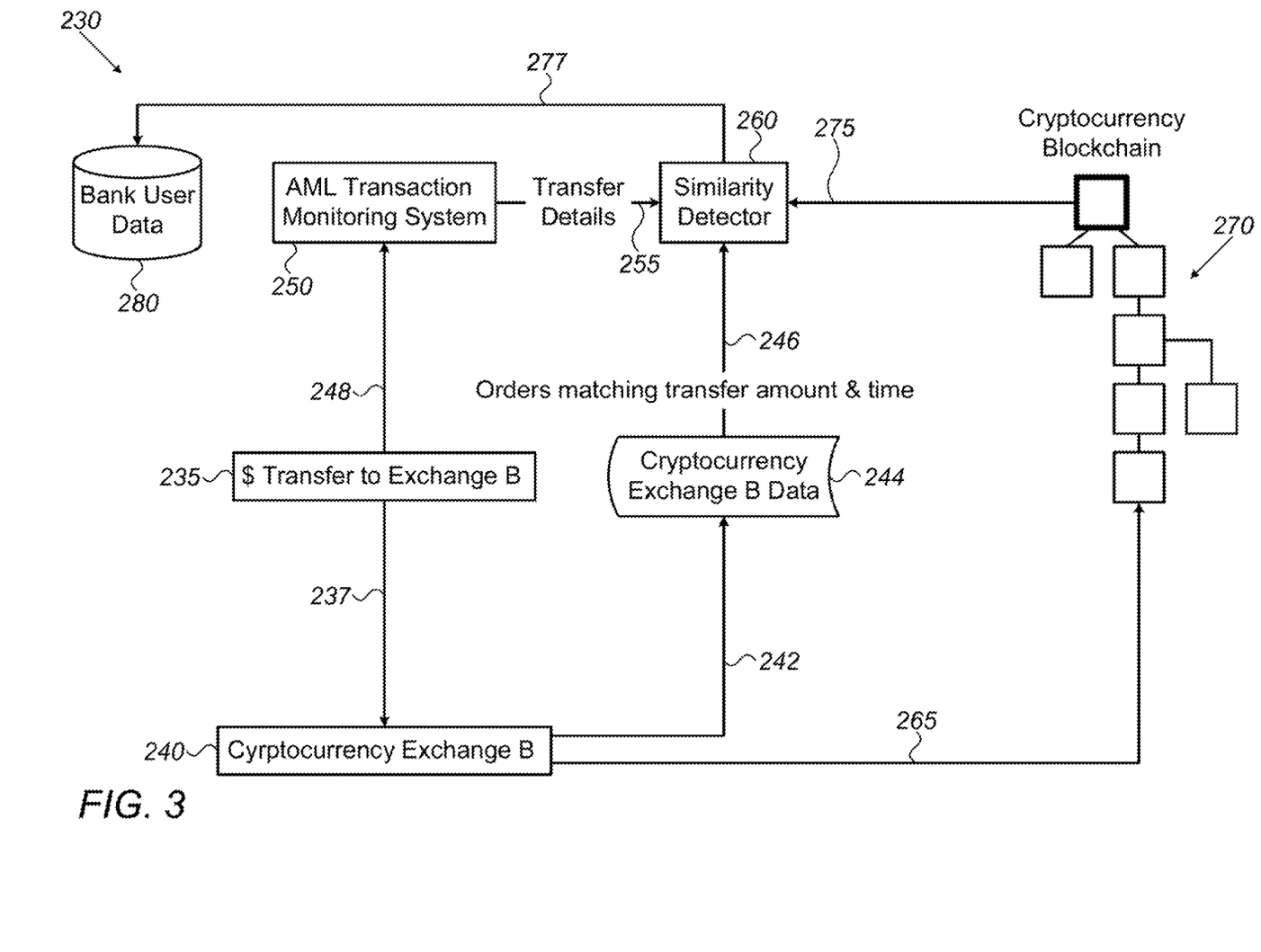
FIG. 3 is a data flow diagram of a system for deanonymizing a cryptocurrency user recorded in a distributed ledger by analyzing bank transfers to a cryptocurrency exchange, in accordance with some embodiments of the present invention.

FIG. 3 is a data flow diagram 230 of system 5 for deanonymizing a cryptocurrency user recorded in distributed ledger 25 by analyzing bank transfers 120 to cryptocurrency exchange 20, in accordance with some embodiments of the present invention. The bank user may transfer 237 a sum of money 235 to a cryptocurrency exchange 240. The bank may relay 248 details of the transfer transaction (e.g., transfer sender, amount, and the transfer beneficiary) to an Anti-Money Laundering (AML) system 250 executed by computer 10, for example. Upon AML system 250 detecting that the transfer beneficiary is cryptocurrency exchange 240, the transfer details may be forwarded 255 to a similarity detector module 260, used to match users front the data sources (e.g., the cryptocurrency exchange data and the blockchain data).

The user may place an order to convert the transferred funds to cryptocurrency on cryptocurrency exchange 240. When the order is fulfilled (e.g., cryptocurrency is purchased), cryptocurrency exchange 240 may publish 242 order data 244 to the public. This data may be stored by system 5 for future matching.

Furthermore, the cryptocurrency purchase may be transcribed 265 on the ledger of a blockchain 270. Thus, similarity detector 260 may be retrieve 275 transactions matching the fulfillment details of fulfilled exchange orders from the blockchain. A database 280 with the user data of the bank may be updated 277 with probable related blockchain user addresses (e.g., anonymous user ID 116).

Figure 4:
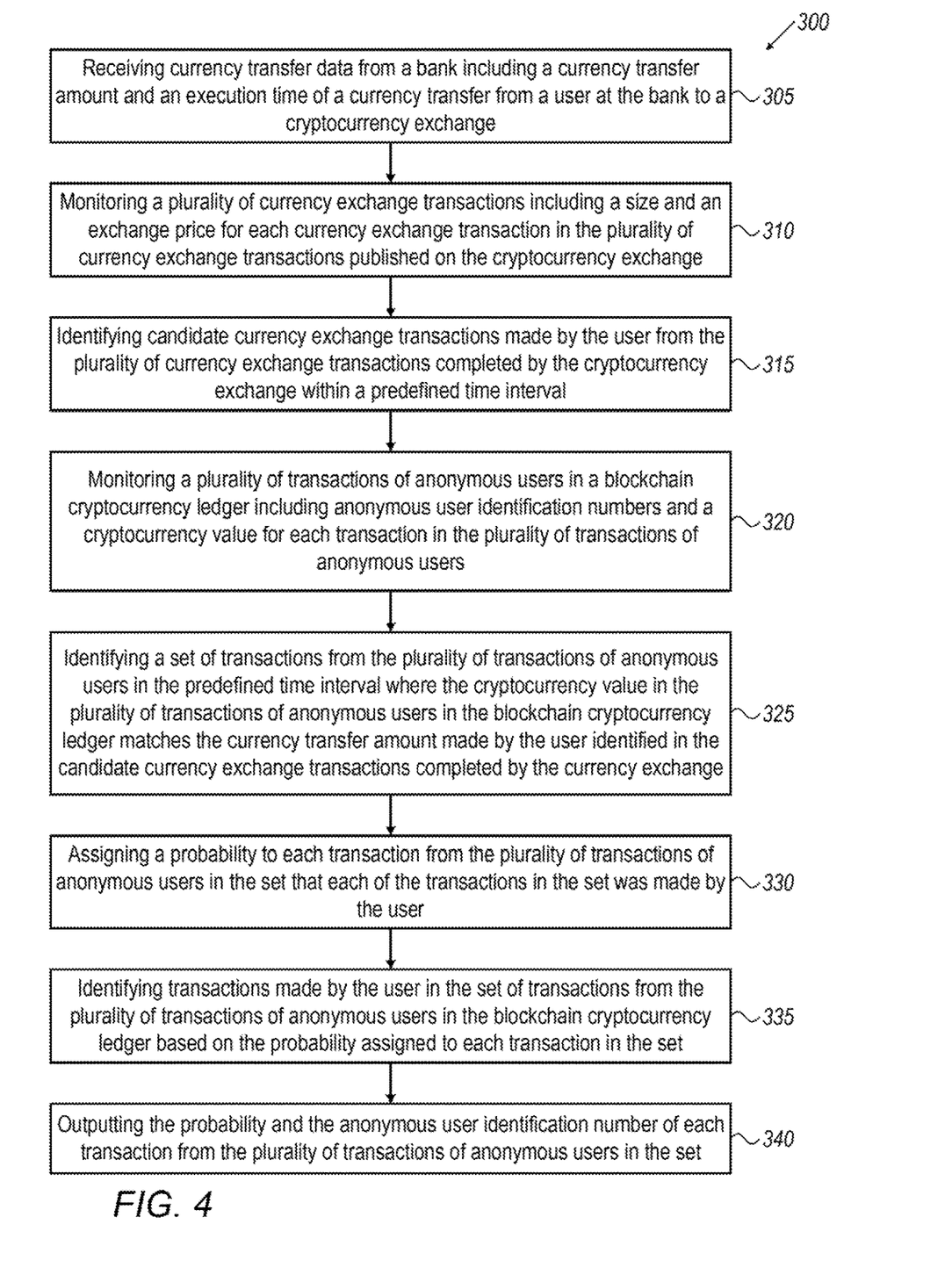
FIG. 4 is a flowchart depicting a method for deanonymizing a cryptocurrency user by analyzing bank transfers from a bank to a cryptocurrency exchange, in accordance with some embodiments of the present invention.

FIG. 4 is a flowchart depicting a method 300 and/or deanonymizing cryptocurrency user by analyzing bank transfers from bank 15 to cryptocurrency exchange 20, in accordance with some embodiments of the present invention. Method 300 may be executed by processor 30 of computer 10.

Method 300 may include receiving 305 currency transfer data 90 from bank 15 including currency transfer amount 96 and execution time 98 of a currency transfer from a user at bank 10 to cryptocurrency exchange 20.

Method 300 may include monitoring 310 a plurality of currency exchange transactions 100 including size 102 and exchange price 104 for each currency exchange transaction 100 in the plurality of currency exchange transactions 100 published on cryptocurrency exchange 20.

Method 300 may include identifying 315 candidate currency exchange transactions made by the user from the plurality of currency exchange transactions 100 completed by cryptocurrency exchange 20 within a predefined time interval.

Method 300 may include monitoring 320 a plurality of transactions 110 of anonymous users 116 in blockchain cryptocurrency ledger 25 including anonymous user identification numbers 116 and cryptocurrency value 114 (e.g., no of bitcoins) for each transaction 110 in the plurality of transactions of anonymous users.

Method 300 may include identifying 325 a set of transactions 110 from the plurality of transactions of anonymous users in the predefined time interval where the cryptocurrency value 114 in the plurality of transactions 110 of anonymous users 114 in blockchain cryptocurrency ledger 25 matches currency transfer amount 96 made by the user identified in the candidate currency exchange transactions (e.g., transactions 100 with size 102 and price 104 matching currency transfer amount 96) that are completed (e.g., executed or filled) by cryptocurrency exchange.

Method 300 may include assigning 330 a probability to each transaction 110 from the plurality of transactions of anonymous users 116 in the set that each of the transactions in the set was made by the user.

Method 300 may include identifying 335 transactions made by the user in the set of transactions from the plurality of transactions 110 of anonymous users in blockchain cryptocurrency ledger 12 based on the probability assigned to each transaction in the set.

Method 300 may include outputting 340 the probability and the anonymous user identification number 116 of each transaction 110 from the plurality of transactions of anonymous users in the set.

Anti-Money Laundering (AML) system 250 (e.g., BTM 55 in FIG. 1) may maintain a list of cryptocurrency exchange accounts as given by Table I. The list may be maintained by the bank for the use in AML system 250.

TABLE I

Example list of beneficiary accounts belonging to cryptocurrency exchanges

| Field name | Example Value |
|---|---|
| ACCOUNT_KEY | 12345 |
| EXCHANGE_NAME | Kevin's Cryptocurrency Converter |

An example of bank transfer data from a user to a cryptocurrency exchange is shown below in Table II. The following fields in the bank transfer data may be used to represent a bank transfer in a Suspicious Activity Monitoring system.

Important fields in Table II may be given by:

TABLE II

Example bank transfer data from a user to a cryptocurrency exchange

| | |
|---|---|
| PARTY_SK | Represents the bank user ID |
| BASE_CURR_AMOUNT | Represents the amount of the transfer |
| EXECUTION_LOCAL_DATE_TIME | When the transfer was executed |
| OPP_ACCOUNT_SK | The beneficiary account |

| Field Name | Transfer 1 | Transfer 2 |
|---|---|---|
| TRANSACTION_KEY | t2_4714_S_2_OUT | t2_4133_S_2_IN |
| ACCT_CURR_AMOUNT | 1596 | 440133 |
| BASE_CURR_AMOUNT | 1596 | 440133 |
| BATCH_DATE_TIME | 26 DEC. 2012 12.00.00.000000 AM | 26 DEC. 2012 12.00.00.000000 AM |
| BENE_CURR_AMOUNT | 1596 | 441367 |
| BENEFICIARY_NAME | Kevin's Cryptocurrency Converter | Branch of Bank Of US |
| EXECUTION_LOCAL_DATE_TIME | 3 MAY 2018 3.00.00.00000 PM | 26 JUN. 2012 12.56.13.000000 AM |
| ORIG_CURR_AMOUNT | 441367 | 441367 |
| ORIGINATOR_NAME | Branch of Bank of Martin Luther King | Branch of Bank of Martin Luther King |
| QUANTITY | 1 | 1 |
| PARTY_SK | 1223 | 1224 |
| BATCH_ID | 2 | 2 |
| ACCOUNT_SK | 6485 | 7854 |
| BASE_CURR_SK | 24 | 24 |
| BENE_CURR_SK | 24 | 24 |
| OPP_ACCOUNT_SK | 12345 | 6485 |
| OPP_COUNTRY_SK | 9 | 30 |
| ORIG_CURR_SK | 24 | 24 |
| TRANSACTION_CODE_SK | 146 | 135 |
| DAY_SK | 4560 | 4560 |
| WEEK_SK | 652 | 652 |
| MONTH_SK | 150 | 150 |
| SAM_TRANS_TYPE_SK | 335 | 354 |
| BATCH_DAY_SK | 4743 | 4743 |
| BATCH_MONTH_SK | 156 | 156 |
| TRANS_DAY_SK | 4560 | 4560 |
| TRANS_MONTH_SK | 150 | 150 |

As an example, the highlighted values in bold in Table II shows that an amount of $15.96 (BASE_CURR_AMOUNT) is being transferred to a cryptocurrency exchange (SAM_OPP_ACCOUNT_SK, BENEFICIARY_NAME). The cryptocurrency may be identified from the data shown, for example, in Table I. According to field given by EXECUTION_LOCAL_DATE_TIME, the transfer was executed at 3 PM on 3 of May.

Note that there is a heuristic for identifying exchange orders that come from non-crypto currencies. Orders from currency conversions, e.g an order for $10 worth of bitcoin will have 8 decimal places after it (0.15312505 BTC). An order placed for 1.5 bitcoin will just have the single decimal place.

Figure 5:
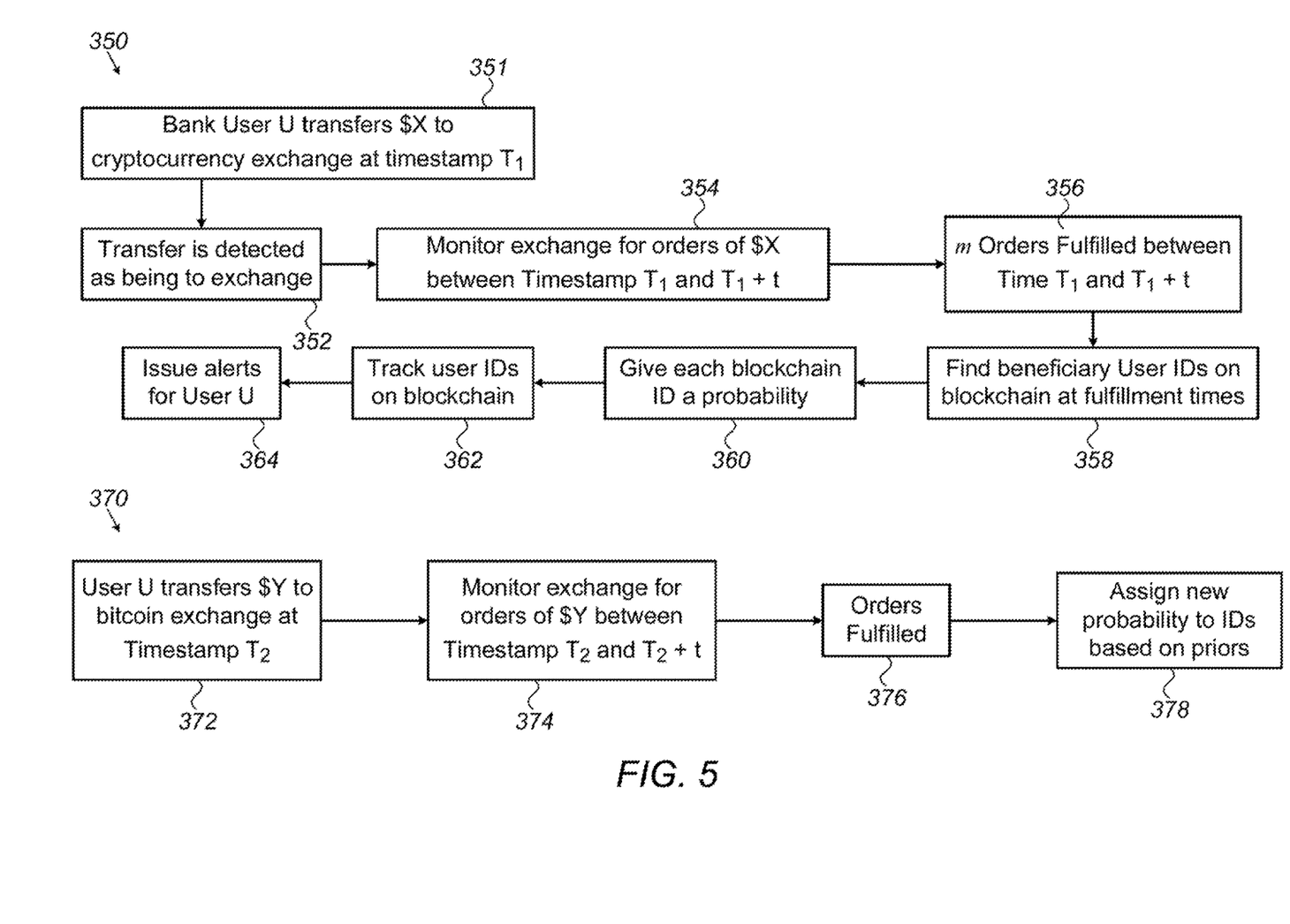
FIG. 5 illustrates flowcharts of a user making two bank transfers to cryptocurrency exchanges, in accordance with some embodiments of the present invention.

FIG. 5 illustrates flowcharts 350 and 370 of a user making two bank transfers to cryptocurrency exchanges, in accordance with some embodiments of the present invention. The previous embodiments in FIGS. 1-4 related to a deanonymizing cryptocurrency exchange user by analyzing a bank transfer made by a user to a cryptocurrency exchange. However, one method for increasing the certainty that an anonymous user ID on the blockchain ledger may be associated with a known user is to analyze multiple bank transfer transactions to a same cryptocurrency exchange or different cryptocurrency exchanges by the same user, and further analyzing fulfilled multiple exchange transactions after the multiple bank transfers are transcribed onto the same blockchain.

In some embodiments of the present invention, a bank customer (U) may transfer 351 an amount X, such as $100.00, for example, to a beneficiary at a transfer time $T_I$. The transfer to a cryptocurrency exchange may be detected 352 by system 5 based on a list of account IDs known to correspond to cryptocurrency exchanges (e.g., OPP_ACCOUNT_SK in exchange_account_id_list as shown in Table II).

Order data publicly published by the cryptocurrency exchange may be monitored 354 from time $T_I$ for a time window oft (e.g., a predefined time interval), until time $T_I+t$ after the bank transfer by the user at time $T_I$ Multiple cryptocurrencies supported by the cryptocurrency exchange may be monitored.

For example, n orders for $X ($100) are found in this time window. Suppose the transfer took place on 2018-07-01 at 13:30. If the time window t is 24 hours, then all n orders of $100 between 2018-07-01 13:30 and 2018-07-02 13:30 for all cryptocurrencies supported by the exchange may be tracked and monitored until fulfillment, where n is an integer. If no orders are found (n=0), the process ends. Suppose that m orders, where m is an integer, are placed for $X between time $T_I$ and time $T_I+t$ that are fulfilled 356 at fulfillment times $FT_I$ ... m, and n−m orders are not fulfilled. If all n (all) orders are cancelled (m=0) then the process ends with no results.

In some embodiments of the present invention, m fulfilled orders corresponding to $X in all supported cryptocurrencies may be found on the blockchain at fulfillment times $FT_I$ ... m. For example, a fulfilled order at the time 15:31:18 on the bitcoin exchange for 0.0017 Bitcoin may include the following data:

```
{'type': 'match',
 'side': 'buy',
 'size': '0.00170000',
 'price': '9385.37000000',
 'product_id': 'BTC-USD',
```

-continued

```
 'time': '2018-07-01T15:31:18.029000Z'}
```

This fulfilled order may be transcribed on the bitcoin blockchain as follows. The matching transaction may include the following data:

```
"weight":536,
"time":1530459078,
    "tx_index":2893612,
    "vin_sz":1,
    "hash":"6e097667a24367824c71be4b482a9f10858e2cdd4dc0151
dbf18741f9ce1593",
    "vout_sz":1
    "relayed_by":"0.0.0.0",
    "out":[
        {
            "spent":true,
            "tx_index":2893612,
            "type":0,
            "addr":"1CSKjrvGRjeGEGQ9eQkzCffp9XKdr6zk3d",
            "value":170000,
            "n":0,
``` where the time is from the unix epoch, and the value is in satoshis (1 bitcoin divided by 100 million) in the matching transaction. Furthermore, a configurable leeway (e.g., 1000 milliseconds in the below pseudocode) may be allowed in matching the blockchain time with the reported currency exchange fulfillment time:

exchange.value=convert(blockchain.value)

convert_time(blockchain.time)−
    1000<exchange.time<convert_time(blockchain-
    .time)+1000

The blockchain user addresses $UB_I$ ... m may be found 358 in the field addr on the blockchain ledger from the transactions at fulfillment times $FT_I$ ... m, that may be assigned to user U with probability $p_i(U_{Bi}=U)$. This probability may be based on an estimated likelihood that an order was placed in the time window t by user U divided by the number of orders placed (n).

In the example where 2 orders may be placed for the transfer amount in the time window (n=2) and t order is fulfilled (m=1), the estimated probability of the user placing an order for the transfer amount in time window t is 0.8. The probability of the address addr (e.g., anonymous user ID 116) corresponding to the fulfilled order being user U is $p(U_{Bi}=U)=0.8/n=0.4$. Thus in this manner, each blockchain anonymous user ID (e.g., addr) may be assigned a probability.

In some embodiments of the present invention, this probability may be updated based on other considerations, such as time between the transfer and order placement, activity levels of the corresponding blockchain user, and frequency of that specific amount appearing on the exchange. This probability may be used as a Poisson trial for updating a prior probability estimates.

In some embodiments of the present invention, once the blockchain user addr are deanonymized, future transactions of blockchain user addresses $U_{Bi}$ ... m may by tracked 362 on the blockchain. Furthermore, if blockchain user $U_{By}$ has subsequent suspicious activity, alerts may be issued 364 against user U with score scales based on $p(U_{By}=U)$.

For example, if the probability of p being blockchain address $U_{Bi}=p(U_{Bi}=U)=0.4$. If after deanomymization, blockchain user $U_{Bi}$ may transfer cryptocurrency to an address known to be connected to money laundering, then an alert with a maximum score 100 may be issued. However, in this example that p($U_{BI}$=U)=0.4, the score may be scaled to score 40 (100 * 0.4) due to the possibility of a mistaken identity.

In a similar vein as shown in FIG. 5, suppose that the same bank customer U transfers 372 another sum $Y. In this case, the cryptocurrency exchange (e.g., second cryptocurrency exchange) of transfer 372 may be different than the cryptocurrency exchange (e.g., first cryptocurrency exchange) of transfer 351; however, the cryptocurrency blockchain must be the same.

In some embodiments of the present invention, transfer 351 may detected and monitored 374 by system 5. Order data publicly published by the second cryptocurrency exchange may be monitored 374 from time $T_2$ for a time window oft, e.g., until Time $T_2$+t. Multiple (n2) orders for $Y may be found in this time window for all supported cryptocurrencies. m2 orders are fulfilled 376 with multiple possible blockchain users $U_{BI}$ . . . m2.

In some embodiments of the present invention, if one of the $U_{BI}$ . . . m2 was also assigned 360 a probability from transactions in the first cryptocurrency, the probability may be updated again based on the probability that the same blockchain user coincidentally was identified in both transactions. This probability can be calculated by considering each transfer as a Poisson trial and calculating the Poisson approximation to derive the probability that both transfers having the same cryptocurrency end user being down to chance.

For example, event $E_1$ has probability 0.4, and event $E_2$ has probability 0.2. The mean μ of these events is 0.3 and the variance is low, such as 0.1, suitable for the Poisson approximation. The Poisson probability is given by:

$$P(x;\mu)=(e^{-\mu})(\mu^x)/x! \quad (1)$$

In the example, for x=2, P(x; μ)=0.033, or 3% that these events occurred by chance (e.g., randomly).

Parameters, such as the number of matches, the frequency of transfer amount, the immediacy of placing the transfer orders relative to the cryptocurrency exchange orders, user activity, and Poisson statistics, may be placed into a machine learning regression model to estimate a probability. The labelling used to train the model may be, for example, a Monte Carlo simulation, as well as possibly some real transactions that may carried out by actors in a blind experiment (e.g., where the potential users do not know the full purpose of the exercise).

The following script below shows an example of cryptocurrency exchange data published by the exchange. The data may have several different types, for example, for open orders (open/received) and fulfilled (done). The important fields in the following script may be given by:

| | |
|---|---|
| Size | for the number of coins ordered |
| Price | for the desired buy price |
| Side | whether the order is a buy or sell |
| Product_id | the cryptocurrency-currency pair being traded |
| Time | The time of the data update. |

{'type': 'received',
'order_id': '151921db-cd6f-43d5-bc0d-fcb0077d7d8a',
'order_type': 'limit',
'size': '0.00170000',
'price': '9385.37000000',
'side': 'buy'
'client _id': '02e7abfe-4ee7-11e8-9f7b-16be7828d23e',
'product_id': 'BTC-USD',
'time': '2018-05-03T15:31:12.806000Z'}

-continued

'type': 'open',
'side': 'buy',
'price': '9385.37000000',
'order_id': '151921db-cd6f-43d5-bc0d-fcb0077d7d8a',
'remaining_size': '0.001700000',
'product_id': 'BTC-USD',
'time': '2018-05-03T15:31:12.806000Z'}
{'type': 'match',
'trade_id': 42805749,
'maker_order_id': '151921db-cd6f-43d5-bc0d-fcb0077d7d8a',
'taker_order_id': 'cf848a56-12df-4afa-9d46-6f066bcc0214',
'side': 'buy',
'size': '0.00170000',
'price': '9385.37000000',
'product_id': 'BTC-USD',
'time': '2018-05-03T15:31:18.029000Z'}
{'type": 'done',
'side': 'buy',
'order_id': '151921db-cd6f-43d5-bc0d-fcb0077d7d8a',
'reason': 'filled',
'product_id': 'BTC-USD',
'price': '9385.37000000',
'remaining_size': '0',
'time': '2018-05-03T15:31:18.029000Z'}

Here the bold fields match the transfer seen previously in the previous scripts and tables. A size of: 0.0017 bitcoins at price 9385.37 is equivalently $15.96. The time is shortly after the transfer 2018 May 3 T15:31:18

An example script of a transaction transcribed on the blockchain ledger is given below. The important fields in the following script may be given by:

| | |
|---|---|
| Time | Transaction time |
| Addr | The blockchain user id |
| Value | The number of coins |

{
"hash":"00000000000003823fa3667d833a354a437bdecf725f1358b17f949c991bfe0a",
"ver":1,
"prev_block":"00000000000004c6f992927254f187ffb8a7877f6519334fd87e173b316a10f8",
"mrkl_root":"dc72e1c2139b0d3378affbc93e2ae98fe2007dae9c3cb18adfc1bee36113455f",
"time":1328830483,
"bits":437004555,
"fee":3550000,
"nonce":4040910433,
"n_tx":145,
"size":48559,
"block_index":223475,
"main_chain":true,
"height":166107,
"tx":[
{
"locktime":0
"ver":1,
"size":134,
"inputs":[
{
"sequence":4294967295,
"witness":"",
"script":"040b290c1a0112"
}
],
"weight":536,
"time":1328830483,
"tx_index":2893612,
"vin_sz":1,
"hash":"6e097667a24367824c71beb4b482a9f10858e2cdd4dc0151dbf18741f9ce1593",
"vout_sz":1,
"relayed_by":"0.0.0.0",
"out":[
{
"spent":true, -continued

```
    "tx_index":2893612,
    "type":0,
    "addr":"1CSKjrvGRjeGEGQ9eQkzCffp9XKdr6zk3d",
    "value":0001700000,
    "n":0,
"script":"4104f071ba1bf271e86987722ab4b4b87b208833357
e368e0f2c3075b809aa32975d4d942eeff4add9095c7bb338
f41d16be987d2028703920e31160016d147ba4a2ac"
   }
  ]
},
```

In the blockchain example script above, there is a transfer of 0.0017 in the value field. The time field of 1328830483 is a Unix epoch timestamp corresponding to a time in the relevant time window.

Table III below is a data table entry of a deanonymized user transferring money from the bank mapped to a cryptocurrency address appearing a transaction transcribed on the blockchain ledger as shown in the example script shown above. This data may be stored in database 70. This table may used, for example, to track map cryptocurrency user to the bank customer. Such mappings may also made for many multiple users.

TABLE III

Data table entry of a deanonymized user transferring money from the bank mapped to a cryptocurrency address on a blockchain

| Field Name | Example Value |
| --- | --- |
| ACCOUNT_SK | 6485 |
| CRYPTO_TYPE | Bitcoin |
| CRYPTO_ADDRESS | 1CSKjrvGRjeGEGQ9eQkzCffp9XKdr6zk3d |
| PROBABILITY | 0.92 |

Some embodiments of live present invention herein describe a computerized method for deanonymizing cryptocurrency users by analyzing bank transfers to a cryptocurrency exchange. The method may be executed by a processor of a computer. (a) Currency transfer data from a bank may be received by the processor including a currency transfer amount and an execution time of a currency transfer from a user at the bank to a cryptocurrency exchange. (b) A plurality of currency exchange transactions including a size and an exchange price for each currency exchange transaction in the plurality of currency exchange transactions published on the cryptocurrency exchange may be monitored by the processor. (c) Candidate currency exchange transactions made by the user from the plurality of currency exchange transactions completed by the cryptocurrency exchange within a predefined time interval may be identified by the processor. (d) A plurality of transactions of anonymous users in a blockchain cryptocurrency ledger including anonymous user identification numbers and a cryptocurrency value for each transaction in the plurality of transactions of anonymous users may be monitored by the processor. (e) A set of transactions from the plurality of transactions of anonymous users in the predefined time interval may be identified by the processor, where the cryptocurrency value in the plurality of transactions of anonymous users in the blockchain cryptocurrency ledger matches the currency transfer amount made by the user identified in the candidate currency exchange transactions completed by the currency exchange. (f) A probability may be assigned by the processor to each transaction from the plurality of transactions of anonymous users in the set that each of the transactions in the set was made by the user. (g) Transactions may be identified by the processor that were made by the user in the set of transactions from the plurality of transactions of anonymous users in the blockchain cryptocurrency ledger based on the probability assigned to each transaction in the set.

In some embodiments of the present invention, the method may include outputting the probability and the anonymous user identification number of each transaction from the plurality of transactions of anonymous users in the set.

In some embodiments of the present invention, identifying the candidate currency exchange transactions made by the user may include comparing the size and the price of the cryptocurrency exchanged in the plurality of currency exchange transactions with the currency transfer amount made by the user front the bank.

In some embodiments of the present invention, the predefined time interval may be based on the execution time of the currency transfer.

In some embodiments of the present invention, assigning the probability may include estimating a likelihood that each transaction from the plurality of transactions of anonymous users in the set was made by the user divided by a number of transactions in the plurality of transactions of anonymous users within the predefined time interval.

In some embodiments of the present invention, receiving the currency transfer data may include receiving the currency transfer data of a respective plurality of currency transfers from the user at the bank to the cryptocurrency exchange at different execution times.

In some embodiments of the present invention, the predefined time interval for each currency transfer in the plurality of currency transfers from the user may be based on the execution time of each currency transfer in the plurality of currency transfers from the bank to the cryptocurrency exchange.

In some embodiments of the present invention, the method may include repeating (b) to (g) for the plurality of currency transfers, and updating the probability that each transaction in the plurality of transactions of anonymous users for each of the plurality of currency transfers from the user is associated with the user.

In some embodiments of the present invention, updating the probability may be selected from the set consisting of evaluating a time difference between the plurality of currency transfers from the user and order placement on the cryptocurrency exchange, activity levels of the anonymous users in the blockchain cryptocurrency ledger, and a frequency of a specific currency transfer amount.

In some embodiments of the present invention, receiving the currency transfer data may include receiving currency transfer data of a respective plurality of currency transfers from different users at the bank to the cryptocurrency exchange at different execution times.

In some embodiments of the present invention, the predefined time interval for each of the plurality of currency transfers may be based on the different execution times of the currency transfers from the different users from the bank to the cryptocurrency exchange.

In some embodiments of the present invention, the method may include repeating (b) to (g) for the plurality of currency transfers for each of the different users, and identifying anonymous user identification numbers in the plurality of transactions of anonymous users for each of the plurality of currency transfers associated with each of the different users.

In some embodiments of the present invention, the method may include storing the identified anonymous user identification numbers associated with each of the different users in a database.

A computerized system for deanonymizing cryptocurrency users by analyzing bank transfers to a cryptocurrency exchange may include a memory and a processor. The processor may be configured to (a) receive currency transfer data from a bank including a currency transfer amount and an execution time of a currency transfer from a user at the bank to a cryptocurrency exchange, (b) to monitor a plurality of currency exchange transactions including a size and an exchange price for each currency exchange transaction from the plurality of currency exchange transactions published on the cryptocurrency exchange, (c) to identify candidate currency exchange transactions made by the user from the plurality of currency exchange transactions completed by the cryptocurrency exchange within a predefined time interval, (d) to monitoring a plurality of transactions of anonymous users in a blockchain cryptocurrency ledger including anonymous user identification numbers and a cryptocurrency value for each transaction in the plurality of transactions of anonymous users, (e) to identify a set of transactions from the plurality of transactions of anonymous users in the predefined time interval where the cryptocurrency value in the plurality of transactions of anonymous users in the blockchain cryptocurrency ledger matches the currency transfer amount made by the user identified in the candidate currency exchange transactions completed by the currency exchange, (f) to assign a probability to each transaction from the plurality of transactions of anonymous users in the set that each of the transactions in the set was made by the user, and (g) to identify transactions made by the user in the set of transactions from the plurality of transactions of anonymous users in the blockchain cryptocurrency ledger based on the probability assigned to each transaction in the set.

In some embodiments of the present invention, the processor may be configured to output the probability and the anonymous user identification number of each transaction from the plurality of transactions of anonymous users in the set.

In some embodiments of the present invention, the processor may be configured to identify the candidate currency exchange transactions made by the user by comparing the size and the price of the cryptocurrency exchanged in the plurality of currency exchange transactions with the currency transfer amount made by the user from the bank.

In some embodiments of the present invention, the predefined time interval may be based on the execution time of the currency transfer.

In some embodiments of the present invention, the processor may be configured to assign the probability by estimating a likelihood that each transaction from the plurality of transactions of anonymous users in the set was made by the user divided by a number of transactions in the plurality of transactions of anonymous users within the predefined time interval.

In some embodiments of the present invention, the processor may be configured to receive the currency transfer data by receiving the currency transfer data of a respective plurality of currency transfers from the user at the bank to the cryptocurrency exchange at different execution times.

In some embodiments of the present invention, the predefined time interval for each currency transfer in the plurality of currency transfers from the user may be based on the execution time of each currency transfer in the plurality of currency transfers from the bank to the cryptocurrency exchange.

In some embodiments of the present invention, the processor may be configured to repeat (b) to (g) for the plurality of currency transfers, and to update the probability that each transaction in the plurality of transactions of anonymous users for each of the plurality of currency transfers from the user is associated with the user.

In some embodiments of the present invention, the processor may be configured to update the probability using features selected from the set consisting of: a time difference between the plurality of currency transfers front the user and order placement on the cryptocurrency exchange, activity levels of the anonymous users in the blockchain cryptocurrency ledger, and a frequency of a specific currency transfer amount.

In some embodiments of the present invention, the processor may be configured to receive the currency transfer data by receiving currency transfer data of a respective plurality of currency transfers from different users at the bank to the cryptocurrency exchange at different execution times.

In some embodiments of the present invention, the predefined time interval for each of the plurality of currency transfers may be based on the different execution times of the currency transfers from the different users from the bank to the cryptocurrency exchange.

In some embodiments of the present invention, the processor may be configured to repeat step (b) to step (g) for the plurality of currency transfers for each of the different users, and to identify anonymous user identification numbers in the plurality of transactions of anonymous users for each of the plurality of currency transfers associated with each of the different users.

In some embodiments of the present invention, the processor may configured to store the identified anonymous user identification numbers associated with each of the different users in a database in the memory.

It should be understood with respect to any flowchart referenced herein that the division of the illustrated method into discrete operations represented by blocks of the flowchart has been selected for convenience and clarity only. Alternative division of live illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A computerized method using a computer comprising a database and a processor, wherein the processor comprises a bank transfer module (BTM) application and a deanonymizer of cryptocurrency user (DACU) application, the method comprising:
   (a) storing, by the processor, in the database user bank account data of a plurality of users and a plurality of cryptocurrency exchange identifiers, a time interval;
   (b) executing, by the processor, the bank transfer module (BTM) application and the deanonymizer of cryptocurrency user (DACU) application;
   (c) collecting, by the processor using the executing BTM application, bank transfer data of transfer transactions from the bank, wherein the bank transfer data of each of the transfer transactions comprises a user identifier, a transfer beneficiary, a currency transfer amount, a currency type, an execution time of the transfer transaction;
   (d) identifying, by the processor using the executing BTM application, that the transfer beneficiary is one of the stored cryptocurrency exchange identifiers;
   based on the identifying that the transfer beneficiary is a cryptocurrency exchange, for each of the transfer transactions:
   (e) monitoring, by the processor using the executing BTM application, a network between the bank and the cryptocurrency exchange, wherein the monitoring the network further comprises monitoring cryptocurrency exchange transactions between the bank and the cryptocurrency exchange over the network within the time interval from the execution time of the transfer transaction and each of the cryptocurrency exchange transactions comprises an exchange amount, an exchange price, an exchange transaction time and an order status;
   (f) selecting, by the processor using the executing DACU application, cryptocurrency exchange transactions from the monitored cryptocurrency exchange transactions that are within the time interval from the execution time of the transfer transaction;
   (g) monitoring, by the processor using the executing DACU application, blockchain transactions on a blockchain ledger, wherein each of the blockchain transactions comprises an anonymous user identification number, a cryptocurrency value and a time stamp;
   (h) selecting, by the processor using the executing DACU application, blockchain transactions from the monitored blockchain transactions comprising the timestamps that are within the time interval from the execution time of the transfer transaction and the cryptocurrency values that match the currency transfer amount of the transfer transaction;
   (i) determining, by the processor using the executing DACU application, a probability that anonymous user identification number belongs to the user identifier of the transfer transaction; and
   (j) updating, by the processor, the user bank account data with the anonymous user identification number and the determined probability in the database.

2. The method according to claim 1, further comprising outputting the determined probability and the anonymous user identification number of each of the transfer transactions.

3. The method according to claim 1, wherein the selecting the cryptocurrency exchange transactions from the monitored cryptocurrency exchange transactions further comprises comparing the exchange amount and the exchange price of each cryptocurrency exchange transaction with the currency transfer amount of the transfer transaction.

4. The method according to claim 1, wherein the time interval is based on the execution time of the transfer transaction.

5. The method according to claim 1, wherein the determining the probability further comprises:
   estimating, using a machine learning regression model, a probability for each of the monitored blockchain transactions, wherein estimating the probability for each of the monitored blockchain transactions comprises determining a likelihood that the corresponding monitored blockchain transaction is related to the transfer transaction; and
   dividing each of the estimated probabilities by a number of the selected blockchain transactions.

6. The method according to claim 1, wherein updating the determined probability further comprising using features consisting of a time difference between the execution time of the transfer transaction and the exchange transaction time of each of the selected cryptocurrency exchange transactions, activity levels of the monitored blockchain transactions, and a frequency of the currency transfer amount.

7. A computerized system, the system comprising:
   a processor, wherein the processor comprises a bank transfer module (BTM) application, a deanonymizer of cryptocurrency user (DACU) application;
   a memory storing a database and instructions that, when executed by the processor, cause the processor to perform the steps of:
   (a) storing in the database user bank account data of a plurality of users and a plurality of cryptocurrency exchange identifiers, a time interval;
   (b) executing the bank transfer module (BTM) application and the deanonymizer of cryptocurrency user (DACU) application;
   (c) collecting, using the executing BTM application, bank transfer data of transfer transactions from the bank, wherein the hank transfer data of each of the transfer transactions comprises a user identifier, a transfer beneficiary, a currency transfer amount, a currency type, an execution time of the transfer transaction;
   (d) identifying, using the executing BTM application, that the transfer beneficiary is one of the stored cryptocurrency exchange identifiers;
   based on the identifying that the transfer beneficiary is a cryptocurrency exchange, for each of the transfer transactions:
   (e) monitoring, using the executing BTM application, a network between the bank and the cryptocurrency exchange, wherein the monitoring the network further comprises monitoring cryptocurrency exchange transactions between the bank and the cryptocurrency exchange over the network within the time interval from the execution time of the transfer transaction and each of the cryptocurrency exchange transactions comprises an exchange amount, an exchange price, an exchange transaction time and an order status;

(f) selecting, using the executing DACU application, cryptocurrency exchange transactions from the monitored cryptocurrency exchange transactions that are within the time interval from the execution time of the transfer transaction;

(g) monitoring, using the executing DACU application, blockchain transactions on a blockchain ledger, wherein each of the blockchain transactions comprises an anonymous user identification number, a cryptocurrency value and a time stamp;

(h) selecting, using the executing DACU application, blockchain transactions from the monitored blockchain transactions comprising the timestamps that are within the time interval from the execution time of the transfer transaction and the cryptocurrency values that match the currency transfer amount of the transfer transaction;

(i) determining, using the executing DACU application, a probability that anonymous user identification number belongs to the user identifier of the transfer transaction; and (j) updating the user bank account data with the anonymous user identification number and the determined probability in the database.

8. The system according to claim 7, wherein the memory stores additional instructions that when executed by the processor further causes the processor to perform the step of:

outputting the determined probability and the anonymous user identification number of each of the transfer transactions.

9. The system according to claim 7, wherein the selecting the cryptocurrency exchange transactions from the monitored cryptocurrency exchange transactions further comprises comparing the exchange amount and the exchange price of each cryptocurrency exchange transaction with the currency transfer amount of the transfer transaction.

10. The system according to claim 7, wherein the time interval is based on the execution time of the transfer transaction.

11. The system according to claim 7, wherein the determining the probability further comprises:

estimating, using a machine learning regression model, a probability for each of the monitored blockchain transactions, wherein estimating the probability for each of the monitored blockchain transactions comprises determining a likelihood that the corresponding monitored blockchain transaction is related to the transfer transaction; and dividing each of the estimated probabilities by a number of the selected blockchain transactions.

12. The system according to claim 7, wherein the determining the probability further comprising using features consisting of a time difference between the execution time of the transfer transaction and the exchange transaction time of each of the selected cryptocurrency exchange transactions, activity levels of the monitored blockchain transactions, a frequency of the currency transfer amount.

* * * * *